Patented Nov. 9, 1926.

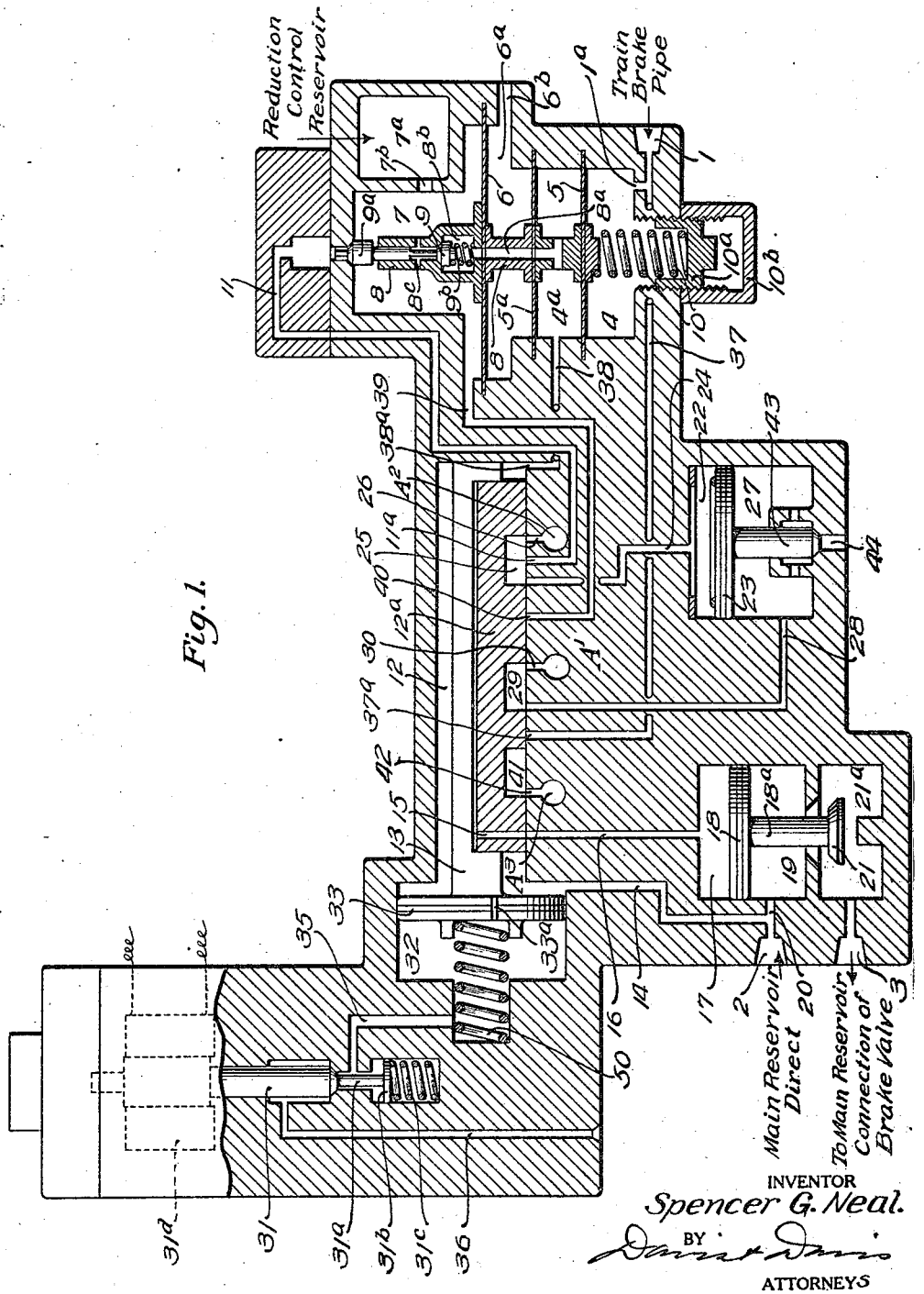

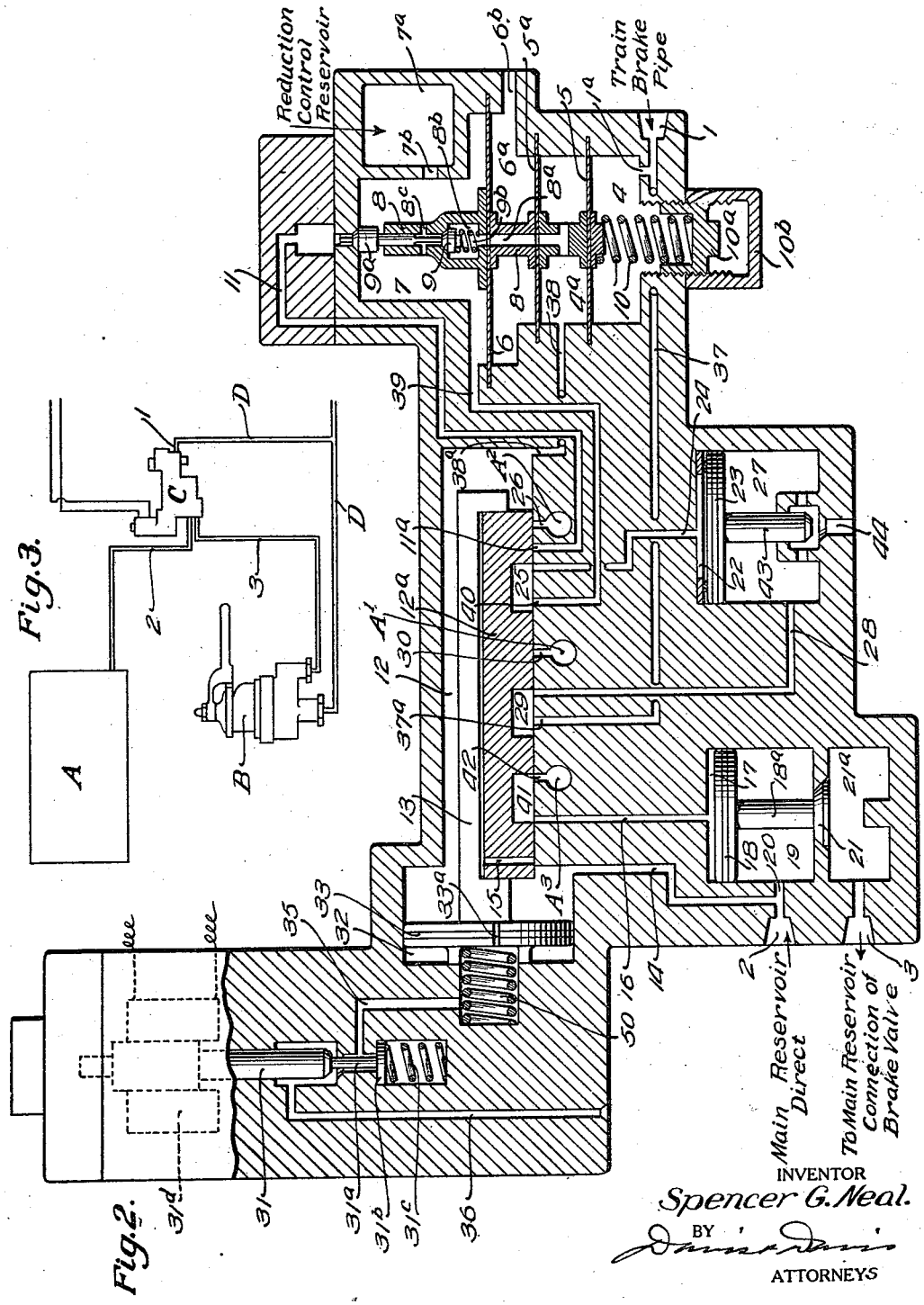

1,606,318

UNITED STATES PATENT OFFICE.

SPENCER G. NEAL, OF NE WYORK, N. Y., ASSIGNOR TO AUTOMATIC STRAIGHT AIR BRAKE COMPANY, OF WILMINGTON, DELAWARE, A CORPORATION OF DELAWARE.

BRAKE-PIPE VENT VALVE FOR AUTOMATIC TRAIN-STOP APPARATUS.

Application filed January 23, 1925. Serial No. 4,259.

In electrically operated train stopping apparatus it is necessary to provide on the train an automatically operating valve to make the desired service reduction in brake pipe pressure to apply the brakes when the train stopping apparatus is effective. Such a valve is desirably adjustable manually in order that it will make any desired reduction in brake pipe pressure. It is also desirable that such valve shall so operate as to deprive the engineer of the power to increase the brake pipe pressure immediately following the automatic application of the brakes through the operation of the train stop or train control apparatus.

One of the principal objects of this invention is to provide an automatically operating brake pipe vent valve which will make a certain predetermined service reduction in brake pipe pressure when the train control apparatus is effective.

Another important object of the invention is to provide an automatically operating valve which will make the desired service reduction in brake pipe pressure and at the same time cut off communication between the main reservoir and the engineer's valve so that the engineer will be deprived of the power of increasing the brake pipe presssure through the usual manipulation of the engineer's valve, immediately following an operation of the train control apparatus, but leaving it within the power of the engineer to make further reductions of brake pipe pressure by the usual manipulation of the engineer's brake valve for that purpose.

Another important object of the invention is to provide such an automatic valve with means to hold it normally inoperative so that the engineer's brake valve may be manipulated in the usual manner for the control of the train by the air brakes.

Another important object of the invention is to provide means whereby the automatically operable valve may be manually adjusted to make any desired service reduction in brake pipe pressure, within reasonable limits.

Another important object of the invention is to provide an automatic valve, as described herein, adapted to operate in any desired degree of brake pipe pressure so that the valve may be used, without special adjustment, in passenger service with a high brake pipe pressure and also in freight service where a comparatively low brake pipe pressure is used.

Another object of the invention is to provide an automatic valve, as described herein, of such construction that the high main reservoir pressure will move it to operative position against merely atmospheric pressure. This insures the valve moving to operative position instantly and positively.

In the drawings:

Fig. 1 is a vertical longitudinal sectional view of the automatic train stop valve showing the apparatus in normal or ineffective position;

Fig. 2 a view similar to Fig. 1 showing the parts in operative position; and

Fig. 3 a diagrammatic view showing the automatic train stop valve, the main reservoir and the engineer's brake valve.

Referring to the various parts by reference characters, A designates the main reservoir, B the engineer's brake valve, C the brake pipe vent valve and D the brake pipe. The brake pipe is connected to the vent valve at 1. The main reservoir is directly connected to the vent valve by pipe 2 and the engineer's brake valve is connected to the vent valve by pipe 3. Brake pipe passage 1 is in direct communication with a chamber 4 through a passage 1ª. The upper wall of chamber 4 is formed by a movable abutment or diaphragm 5. A diaphragm 5ª is arranged above the diaphragm 5 and parallel therewith to form a main reservoir chamber 4ª between said diaphragms. The diaphragms 5 and 5ª are of the same area. Above diaphragm 5ª, and spaced a suitable distance therefrom is a large diaphragm 6, this latter diaphragm being arranged in a large chamber 6ª. The space between the diaphragms 5ª and 6 is open to atmosphere directly through a port 6ᵇ so that there will be no pressure between said diaphragms. Above the diaphragm 6 is formed a control chamber 7, and in open communication with said chamber is a reduction control reservoir or chamber 7ª, said reservoir being in open communication with chamber 7 through port 7ᵇ. The purpose of this reservoir is to augment the volume of chamber 7 so that there will be no appreciable reduction in chamber 7 when the valve is in operative position, as hereinafter described. The three diaphragms are rigidly connected together by means of a jointed central stem 8 formed with a central longitudinally extending passage $8^a$ which opens at its lower end into the main reservoir chamber $4^a$ and opens at its upper end into a small chamber $8^b$ formed in the stem above the diaphragm 6. The stem 8 above the chamber $8^b$ is tubular and in said tubular portion is arranged a valve stem carrying a valve 9 at its lower end and a valve $9^a$ at its upper end. A portion of the stem is reduced in diameter, or provided with longitudinal grooves to form an air passage along said stem. The valve 9 seats on the upper wall of the chamber $8^b$, a spring $9^b$ tending normally to press the valve 9 upwardly to its seat. The tubular upper portion of the stem 8 is formed with lateral ports $8^c$ which place the control chamber 7 in communication with the interior of the tubular stem adjacent the reduced portion of the stem carrying the valve 9. The valve $9^a$ controls a port which connects the chamber 7 with a passage 11. The diaphragms are held in their normal position by means of a spring 10 arranged in the chamber 4 and bearing at its upper end on the lower end of the stem 8 and at its lower end in a vertically adjustable cup $10^a$. By manually adjusting the threaded cup $10^a$ the pressure exerted by the spring 10 on the diaphragm structure may be increased or diminished as desired, within reasonable limits. The adjustable cup $10^a$ is locked in its adjusted position by means of a protecting cap $10^b$ which is adapted to be screwed on the adjustable cup and locked against the outer side of the valve casing. There is a slight play or lost motion between the upper end of the stem 8 and the under side of the valve $9^a$. This permits the diaphragm 6 and the tubular stem 8 to rise slightly after the valve $9^a$ is seated and for the purpose of moving the seat away from the valve 9. This movement of the diaphragm and the tubular stem 8 places the chamber $4^a$ in communication with the chamber 7 and closes communication between the chamber 7 and the passage 11. When the diaphragm structure and the tubular stem 8 carried thereby move downwardly valve 9 will be seated to close communication between chamber $4^a$ and chamber 7 and valve $9^a$ will remain closed. Brake pipe pressure will be registered in chamber 4 under the diaphragm 5. The diaphragm 6 is of greater area than diaphragm 5 so that a lighter or a less degree of pressure in chamber 7 will overcome a higher brake pipe pressure in chamber 4.

In the valve casing is formed a slide valve chamber 12 in which is arranged a slide valve $12^a$ operating on a valve seat. The slide valve is connected to a longitudinally extending valve stem 13, said stem being connected at one end to a main piston 33 operating in a chamber 32. The slide valve $12^a$ is held in its inner, normal, inoperative position by spring 50, suitably arranged in the valve casing. The valve $12^a$ is formed with a port 15 which, in the normal inoperative position of the valve, connects the valve chamber 12 with a chamber 17 above a piston 18. Below the piston 18 is a chamber 19 which is connected by passage 20 with the main reservoir connection 2. Passage 20 is connected by a passage 14 direct to the valve chamber 12 so that main reservoir pressure will always be present in the said chamber. A depending central stem $18^a$ is connected to the piston 18 and carries at its lower end an upwardly seating valve 21. The valve 21 is arranged in a chamber $21^a$ which is in direct communication with the engineer's brake valve connection 3. The valve 21 in the upper position of the piston 18, closes communication between chamber 19 and 21 and thereby closes communication between the main reservoir and the engineer's brake valve. When this valve 21 is closed the engineer's brake valve cannot be manipulated to place the main reservoir in communication with the brake pipe. The engineer may, however, place the engineer's brake valve in application position or in emergency position and thereby make a further reduction in brake pipe pressure for the purpose of increasing the pressure in the brake cylinders. He cannot, however, release the brakes until the apparatus has been restored to normal position and the valve 21 has been moved to open communication between chambers 19 and $21^a$.

An equalizing discharge piston 23 is arranged as a movable abutment separating chambers 22 and 27, chamber 22 being above the piston and 27 below it. The piston 23 carries a depending central stem whose lower end forms an equalizing discharge valve 43 adapted to close an exhaust port 44. Normally the valve is seated and the port closed merely by the weight of the piston and the valve. The chamber 22 is connected to a port in the slide valve seat by a passage 24. The chamber 27 is connected to a port in the slide valve seat by a passage 28. The slide valve is formed with a cavity 29 which in the normal in-operative position of the slide valve connects port and passage 28 with a port 30 which leads to atmospheric port $A^1$ so that in the normal in-operative position of the slide valve there will be no pressure in chamber 27 and valve 43 will be seated. The slide valve is also formed with a cavity 25, which, in the normal in-operative position of said valve, will connect the port and passage 24 to a port 26 which leads to atmospheric port $A^2$, so that in the said position of the slide valve, chamber 22 will be open to atmosphere and there will be no pressure therein. Passage 11 leads to a port 11ª in the slide valve seat adjacent the port 26 and in the normal inoperative position of the main slide valve, cavity 25 connects said port 11ª to the port 26.

The brake pipe connection, or passage 1 is connected by a passage 37 to a port 37ª in the slide valve seat. The main reservoir chamber 4ª is connected by a passage 38 to a port 38ª leading into the slide valve chamber 12 so that main reservoir pressure will always be present in chamber 4ª. The chamber 7 is connected by a passage 39 to a port 40 in the slide valve seat. The slide valve is provided with a cavity 41 which, in the operating position of the slide valve, will connect the passage 16 to a port 42 which leads to atmospheric port A³. The main piston 33 is provided with a small leak port 33ª which connects the slide valve chamber 12 to the chamber 32.

The chamber 32 is connected by a passage 35 to an exhaust passage 36. The connection between these two passages is controlled by a downwardly seating electrically operated exhaust valve 31. The valve 31 is formed with a depending stem 31ª which carries at its lower end a head 31ᵇ. Below the said head and normally pressing the valve 31 upwardly away from its seat is a spring 31ᶜ. The upper end of the valve 31 is provided with a core which is adapted to reciprocate in an electric coil 31ᵈ, shown in dotted lines. When the coil is energized by current flowing therethrough the core carrying the valve 31 is drawn downwardly and the valve 31 is held to its seat. The downward pull of the solenoid coil is sufficient to seat the valve 31 against the pressure of the spring 31ᶜ and against the air pressure in chamber 32. When the current through the coil is broken and the coil de-energizes the spring and the pressure in chamber 32 will move the valve upwardly away from its seat and open the chamber 32 directly to the exhaust passage 36. The piston 33 is provided with lugs which are adapted to engage the end wall of the chamber 32 to prevent the piston from sealing the exhaust passage 35. The electric circuit through the coil 31ᵈ is broken by the automatic train stop apparatus when conditions require that the train brakes be applied.

*Operation.*

When the brake system is being charged the engineer's brake valve is operated to full release or running position in the usual manner and air direct from the main reservoir will flow to chamber 19 below piston 18 and will also flow into chamber 12 through passage 14. Air will also flow from chamber 12 through passages 15 and 16 to chamber 17 above the piston 18. The pressure being balanced on opposite sides of the piston 18, the piston and the valve 21 will be forced to their lower position by the pressure on the valve 21 and said valve will remain open. Main reservoir air will flow from chamber 21ª through the connection 3 to the engineer's brake valve and thence to the brake pipe in the usual manner. The circuit through the coil 31ᵈ is normally closed, thereby holding valve 31 seated to close the exhaust passage 35. With the valve 31 closed, air will leak through the port 33ª and there will be an equalization of pressures on opposite sides of the piston 33 and the spring 50 will thereupon hold the slide valve in its inner inoperative position. Main reservoir air will also flow from chamber 12 through passage 38 into chamber 4ª. Brake pipe air will flow through pipe D to connection 1 and thence through port 1ª into chamber 4. The spring 10 in chamber 4 will normally hold the diaphragm structure and the stem 8 in their upper positions. This will seat valve 9ª and unseat valve 9. Air from chamber 4ª will flow upwardly through the passage 8ª past valve 9 through ports 8ᶜ into chamber 7. The diaphragms 5 and 5ª being of equal area the pressure in chamber 4ª will be balanced and therefore will have no effect upon the diaphragm structure and will not end to move it in either direction. Chamber 6ª is open to atmosphere. The pressure in chamber 7 will build up until it exerts a downward force sufficient to overcome the upward force of the pressure in chamber 4 and the upward force exerted by the spring 10. When this degree of pressure is reached in chamber 7 the diaphragm structure will move downwardly slightly and seat valve 9, thereby stopping the flow of air into chamber 7.

The large diaphragm 6 is so proportioned in area with respect to diaphragm 5 that with no tension on spring 10 the diaphragm will be lowered to close valve 9 when the pressure in chamber 7 has been increased to within twenty-five pounds of the existing brake pipe pressure in chamber 4. Should the spring 10 be compressed and adjusted to exert an upward pressure on the diaphragm 5 to assist the brake pipe pressure in chamber 4 in opposing the downward force exerted by pressure in chamber 7 it would be necessary to develop a higher pressure in chamber 7 to overcome this increased resistance. By manually adjusting the spring 10 to vary its pressure on diaphragm 5 the degree of pressure necessary to be built up in chamber 7 may be varied. By providing for different adjustments of the spring tensions the difference in pressure between chambers 4 and 7 is optional between equalization and a twenty-five pound differential. This differential in pressure controls the amount of service brake pipe reduction when the brake pipe vent valve is brought into operation.

Valve 9ª is provided for the purpose of preventing an excess pressure in chamber 7. Should the pressure build up in chamber 7 through a leakage past valve 9, the perfect balance between the pressures in chambers 7 and 4 will be destroyed and the diaphragm and the parts directly connected therewith will be lowered, thus opening valve 9ª to permit the escape of air from chamber 7 at the same rate as the leakage past valve 9. Air flowing past valve 9ª will flow direct to atmosphere through passage 11, cavity 25 and atmospheric port A².

When, in the operation of the automatic train stop apparatus, or otherwise, the coil 31ᵈ is de-energized, the spring 31ᶜ and the pressure in chamber 32 will immediately lift valve 31 and thereby open chamber 32 direct to atmosphere. The main reservoir pressure in chamber 12 will instantly and positively force the piston 33 and the slide valve connected thereto outwardly against the pressure of spring 50 and will hold the slide valve in operative position (see Fig. 2). This position of the slide valve will cut off communication between the main reservoir and chamber 17 above the piston 18, and cavity 41 will connect passage 16 to atmospheric port A³, thereby venting chamber 17 to atmosphere. The high main reservoir pressure in chamber 19 will then instantly and positively seat valve 21 and cut off communication between the main reservoir and the engineer's brake valve. This will prevent the engineer from so manipulating his brake valve as to increase brake pipe pressure for a release of the brakes. The brake valve may be manipulated to reduce brake pipe pressure either by a movement to service position or by a movement to emergency position.

In the operative position of the slide valve, cavity 29 places port and passage 37—37ª in communication with passage 28 and brake pipe air will flow to chamber 27 below the equalizing discharge piston 23. This pressure in chamber 27 will raise the piston 23 and open valve 43 to permit brake pipe pressure to discharge to atmosphere. The cavity 25 of the slide valve will connect passage 39 and port 40 to passage 24 so that the air from chamber 7 may flow direct to chamber 22 above the equalizing discharge piston 23. As herein described pressure in the control chamber 7 is maintained at a predetermined pressure below the brake pipe pressure. Thus the differential in pressure between the control chamber pressure in chamber 22 and the brake pipe pressure in chamber 27 will be the same as that between that in chamber 4 and the control chamber 7. With this differential in pressure existing on opposite sides of the piston 22 the brake pipe pressure will raise this piston to open the equalizing discharge valve 43 and brake pipe pressure will be vented direct to atmosphere at a service rate through passage 37 and the connected ports and passages leading to the exhaust port 44. The brake pipe pressure will continue to flow to atmosphere until the pressure in chamber 27 has been reduced to an equality with the pressure in chamber 22, at which time the valve 43 will close. As hereinbefore pointed out, by varying the tension of the spring 10 the amount of brake pipe reduction secured through the operation of the apparatus may be varied at will. To prevent the escape of air from chamber 7 to atmosphere, should valve 9ª be open when the apparatus becomes operative, the passage 11 is cut off from the atmospheric port A² and closed when the slide valve is in operative position as shown in Fig. 2.

The amount of brake pipe reduction secured through the operation of the vent valve is governed entirely by the differential in pressure between the brake pipe pressure in chamber 4 and the pressure in the control chamber 7.

When the coil 31ᵈ is again energized the valve 31 will be closed. Air will leak through port 33ª, and, when the pressure in chamber 32 has been raised sufficiently, the spring 50 will move the slide valve to its inner inoperative position as shown in Fig. 1. Main reservoir air will then flow direct to chamber 17 and equalize with the pressure in chamber 19, thereby permitting the pressure in said chamber to force the valve 21 to open position. The chamber 22 will be vented to atmosphere through cavity 25 and atmospheric port A² and the equalizing discharge valve will close. The differential of pressure again will be established in chambers 4 and 7.

The diaphragms 5 and 6 are so proportioned as to give a predetermined ratio of pressures between the chambers 4 and 7. This ratio of differential pressures will be maintained regardless of the degree of brake pipe pressure in chamber 4. This pressure may be seventy pounds for brake service, or one hundred ten for passenger service. These diaphragms are preferably so proportioned that when the vent valve is used in freight service or in passenger service it will bring about approximately the standard brake pipe reduction for both of the said services. The brake pipe reduction brought about by the operation of the vent valve will be higher in passenger service than in freight service due to the fact that a higher brake pipe pressure is used in passenger service. The ratio of this reduction, however, remains the same in all cases.

What I claim is:

1. A brake pipe vent valve for automatic train stop apparatus comprising a valve casing formed with a brake pipe chamber and a control chamber, means for establishing a pressure in the control chamber at a predetermined degree of pressure below the pressure in the brake pipe chamber, an equalizing discharge valve, an equalizing discharge piston connected to said valve, an exhaust valve, electrically operated means for holding the exhaust valve closed, means for opening said valve when the electrically operated means is rendered ineffective, and means operated by the opening of the said exhaust valve to connect the control chamber to a chamber on one side of the equalizing discharge piston and to connect the brake pipe to a chamber on the other side of the equalizing discharge piston, the brake pipe pressure opposing the control chamber pressure and opening the equalizing discharge valve to permit brake pipe pressure to exhaust to atmosphere until said brake pipe pressure has equalized with the pressure in the control chamber.

2. A brake pipe vent valve for automatic train stop apparatus comprising a valve casing formed with a brake pipe chamber and a control chamber, means for establishing a pressure in the control chamber at a predetermined degree of pressure below the pressure in the brake pipe chamber, an equalizing discharge valve, an equalizing discharge piston connected to said valve, an exhaust valve, electrically operated means for controlling the operation of the exhaust valve, and means operated by the opening of the said exhaust valve to connect the control chamber to a chamber on one side of the equalizing discharge piston and to connect the brake pipe to a chamber on the other side of the equalizing discharge piston the brake pipe pressure opposing the control chamber pressure and opening the equalizing discharge valve to permit brake pipe pressure to exhaust to asmosphere until said brake pipe pressure has equalized with the pressure in the control chamber.

3. A brake pipe vent valve for automatic train stop apparatus comprising a valve casing formed with a brake pipe chamber and a control chamber, means for establishing a pressure in the control chamber at a predetermined degree of pressure below the pressure in the brake pipe chamber, an equalizing discharge valve, an equalizing discharge piston connected to said valve, an exhaust valve, electrically operated means for controlling the operation of the exhaust valve, and means operated by the opening of the said exhaust valve to connect the control chamber to a chamber on one side of the equalizing discharge piston and to connect the brake pipe to a chamber on the other side of the equalizing discharge piston, the brake pipe pressure opposing the control chamber pressure and opening the equalizing discharge valve to permit brake pipe pressure to exhaust to atmosphere from the equalizing discharge piston chamber.

4. A brake pipe vent valve for automatic train stop apparatus comprising a valve casing formed with a brake pipe chamber and a control chamber, means operated by the pressures in the said brake pipe chamber and in the control chamber for establishing a pressure in the control chamber at a predetermined degree of pressure below the pressure in the brake pipe chamber, an equalizing discharge valve, an equalizing discharge piston connected to said valve, an exhaust valve, electrically operated means for holding the exhaust valve closed, means for opening said valve when the electrically operated means is rendered ineffective, and means operated by the opening of the said exhaust valve to connect the control chamber to a chamber on one side of the equalizing discharge piston and to connect the brake pipe to a chamber on the other side of the equalizing discharge piston, the brake pipe pressure opposing the control chamber pressure and opening the equalizing discharge valve to permit brake pipe pressure to exhaust to atmosphere until said brake pipe pressure has equalized with the pressure in the control chamber.

5. A brake pipe vent valve for automatic train stop apparatus comprising a valve casing formed with a brake pipe chamber and a control chamber, means for establishing a pressure in the control chamber at a predetermined degree of pressure below the pressure in the brake pipe chamber, an equalizing discharge valve, an exhaust valve, electrically operated means for controlling the operation of the exhaust valve, and means automatically operating upon the opening of the said exhaust valve to open the equalizing discharge valve, the brake pipe pressure opposing the control chamber pressure to hold the equalizing discharge valve open to permit brake pipe pressure to exhaust to atmosphere until said brake pipe pressure has equalized with the pressure in the control chamber.

6. A brake pipe vent valve for automatic train stop apparatus comprising a valve casing formed with a brake pipe chamber and a control chamber, means operated by the pressures in the said brake pipe chamber and in the control chamber for establishing a pressure in the control chamber at a predetermined degree of pressure below the pressure in the brake pipe chamber, an equalizing discharge valve, an exhaust valve, electrically operated means for controlling the operation of the exhaust valve, and means automatically operating upon the opening of the said exhaust valve to open the equalizing discharge valve, the brake pipe pressure opposing the control chamber pressure to hold the equalizing discharge valve open to permit brake pipe pressure to exhaust to atmosphere until said brake pipe pressure has equalized with the pressure in the control chamber.

7. A brake pipe vent valve for automatic train stop apparatus comprising a valve casing formed with a brake pipe chamber and a control chamber, means for establishing a pressure in the control chamber at a predetermined degree of pressure below the pressure in the brake pipe chamber, an equalizing discharge valve, an exhaust valve, electrically operated means for controlling the operation of the exhaust valve, and means automatically operating upon the opening of the said exhaust valve to open the equalizing discharge valve, the brake pipe pressure opposing the control chamber pressure to hold the equalizing discharge valve open to permit brake pipe pressure to exhaust to atmosphere from the equalizing discharge valve chamber.

8. A brake pipe vent valve for automatic train stop apparatus comprising a valve casing formed with a brake pipe chamber and a control chamber, means operated by the pressures in the said brake pipe chamber and in the control chamber for establishing a pressure in the control chamber at a predetermined degree of pressure below the pressure in the brake pipe chamber, an equalizing discharge valve, an exhaust valve, electrically operated means for controlling the operation of the exhaust valve, and means automatically operating upon the opening of the said exhaust valve to open the equalizing discharge valve, the brake pipe pressure opposing the control chamber pressure to hold the equalizing discharge valve open to permit brake pipe pressure to exhaust to atmosphere from the equalizing discharge valve chamber.

9. A brake pipe vent valve for automatic train stop apparatus comprising a brake pipe chamber and a control chamber, means for establishing a pressure in the control chamber at a predetermined degree of pressure below the pressure in the brake pipe chamber, an equalizing discharge valve, an exhaust valve, means for controlling the operation of the exhaust valve, and means automatically operating upon the opening of the said exhaust valve to open the equalizing discharge valve, the brake pipe pressure opposing the control chamber pressure to hold the equalizing discharge valve open to permit brake pipe pressure to atmosphere until said brake pipe pressure has equalized with the pressure in the control chamber.

10. A brake pipe vent valve for automatic train stop apparatus comprising a brake pipe chamber and a control chamber, means operated by the pressures in the said brake pipe chamber and in the control chamber for establishing a pressure in the control chamber at a predetermined degree of pressure below the pressure in the brake pipe chamber, an equalizing discharge valve, an exhaust valve, means for controlling the operation of the exhaust valve, and means automatically operating upon the opening of the said exhaust valve to open the equalizing discharge valve, the brake pipe pressure opposing the control chamber pressure to hold the equalizing discharge valve open to permit brake pipe pressure to exhaust to atmosphere until said brake pipe pressure has equalized with the pressure in the control chamber.

11. A brake pipe vent valve comprising a brake pipe chamber and a control chamber, means for establishing a pressure in the control chamber at a predetermined degree of pressure below the pressure in the brake pipe chamber, an equalizing discharge valve, an exhaust valve, means for controlling the operation of the exhaust valve, and means automatically operating upon the opening of the said exhaust valve to open the equalizing discharge valve, the brake pipe pressure opposing the control chamber pressure to hold the equalizing discharge valve open to permit brake pipe pressure to exhaust to atmosphere from the equalizing discharge valve chamber.

12. A brake pipe vent valve comprising a brake pipe chamber and a control chamber, means operated by the pressures in the said brake pipe chamber and in the control chamber for establishing a pressure in the control chamber at a predetermined degree of pressure below the pressure in the brake pipe chamber, an equalizing discharge valve, an exhaust valve, means for controlling the operation of the exhaust valve, and means for automatically operating upon the opening of the said exhaust valve to open the equalizing discharge valve, the brake pipe pressure opposing the control chamber pressure to hold the equalizing discharge valve open to permit brake pipe pressure to exhaust to atmosphere from the equalizing discharge valve chamber.

13. A brake pipe vent valve for automatic train stop apparatus comprising a brake pipe chamber and a control chamber, means for establishing a pressure in the control chamber at a predetermined degree of pressure below the pressure in the brake pipe chamber, manually operable means to vary the degree of pressure established in the control chamber, an equalizing discharge valve, an exhaust valve, means for controlling the operation of the exhaust valve, and means automatically operating upon the opening of the said exhaust valve to open the equalizing discharge valve, the brake pipe pressure opposing the control chamber pressure to hold the equalizing discharge valve open to permit brake pipe pressure to exhaust to atmosphere until said brake pipe pressure has equalized with the pressure in the control chamber.

14. A brake pipe vent valve for automatic train stop apparatus comprising a brake pipe chamber and a control chamber, means operated by the pressures in the said brake pipe chamber and in the control chamber for establishing a pressure in the control chamber at a predetermined degree of pressure below the pressure in the brake pipe chamber, manually operable means to vary the degree of pressure established in the control chamber, an equalizing discharge valve, an exhaust valve, means for controlling the operation of the exhaust valve, and means automatically operating upon the opening of the said exhaust valve to open the equalizing discharge valve, the brake pipe pressure opposing the control chamber pressure to hold the equalizing discharge valve open to permit brake pipe pressure to exhaust to atmosphere until said brake pipe pressure has equalized with the pressure in the control chamber.

15. A brake pipe vent valve comprising a brake pipe chamber and a control chamber, means for establishing a pressure in the control chamber at a predetermined degree of pressure below the pressure in the brake pipe chamber, manually operable means to vary the degree of pressure established in the control chamber, an equalizing discharge valve, an exhaust valve, means for controlling the operation of the exhaust valve, and means automatically operating upon the opening of said exhaust valve to open the equalizing discharge valve, the brake pipe pressure opposing the control chamber pressure to hold the equalizing discharge valve open to permit brake pipe pressure to exhaust to atmosphere from the equalizing discharge valve chamber.

16. A brake pipe vent valve comprising a brake pipe chamber and a control chamber, means operated by the pressures in the said brake pipe chamber and in the control chamber for establishing a pressure in the control chamber at a predetermined degree of pressure below the pressure in the brake pipe chamber, manually operable means to vary the degree of pressure established in the control chamber, an equalizing discharge valve, an exhaust valve, means for controlling the operation of the exhaust valve, and means automatically operating upon the opening of the said exhaust valve to open the equalizing discharge valve, the brake pipe pressure opposing the control chamber pressure to hold the equalizing discharge valve open to permit brake pipe pressure to exhaust to atmosphere from the equalizing discharge valve chamber.

17. A brake pipe vent valve for automatic train stop apparatus comprising a brake pipe chamber, a control chamber, a movable abutment subject to the pressure in the brake pipe chamber, a movable abutment subject to the pressure in the control chamber, this latter abutment being larger in area than the train pipe pressure abutment, means rigidly connecting said two abutments whereby the pressures in said chambers will oppose each other, a valve adapted to be opened and closed by the movements of the abutments and when open to admit air into the control chamber, a valve adapted to be operated by the movements of the abutments and when open to exhaust air from the control chamber, a spring bearing on the brake pipe pressure abutment and adapted to oppose the force exerted by the pressure in the control chamber, means for manually adjusting the tension of said spring, an equalizing discharge valve, an exhaust valve, means for controlling the operation of the exhaust valve, and means automatically operating upon the opening of the said exhaust valve to open the equalizing discharge valve, the brake pipe pressure opposing the control chamber pressure to hold the equalizing discharge valve open to permit brake pipe pressure to exhaust to atmosphere until said brake pipe pressure has equalized with the pressure in the control chamber.

18. A brake pipe vent valve for automatic train stop apparatus comprising a brake pipe chamber, a control chamber, a movable abutment subject to the pressure in the brake pipe chamber, a movable abutment subject to the pressure in the control chamber this latter abutment being larger in area than the train pipe pressure abutment, means rigidly connecting said two abutments whereby the pressures in said chambers will oppose each other, a valve adapted to be opened and closed by the movements of the abutments and when open to admit air into the control chamber, a valve adapted to be operated by the movements of the abutments and when open to exhaust air from the control chamber, a spring bearing on the brake pipe pressure abutment and adapted to oppose the force exerted by the pressure in the control chamber, means for manually adjusting the tension of said spring, an equalizing discharge valve, an equalizing discharge piston connected to said valve, an exhaust valve, electrically operated means for holding the exhaust valve closed, means for opening said valve when the electrically operated means is rendered ineffective, and means operated by the opening of the said exhaust valve to connect the control chamber to a chamber on one side of the equalizing discharge piston and to connect the brake pipe to a chamber on the other side of the equalizing discharge piston, the brake pipe pressure opposing the control chamber pressure and opening the equalizing discharge valve to permit brake pipe pressure to exhaust to atmosphere until said brake pipe pressure has equalized with the pressure in the control chamber.

19. A brake pipe vent valve for automatic train stop apparatus comprising a brake pipe chamber, a control chamber, a main reservoir chamber, a movable abutment subject to the pressure in the brake pipe chamber, a movable abutment subject to the pressure in the control chamber this latter abutment being larger in area than the train pipe pressure abutment, a movable abutment subject to the pressure in the main reservoir chamber, means rigidly connecting said abutments together, whereby the pressures in the control chamber and in the brake pipe chamber will oppose each other, a valve adapted to be opened and closed by the movements of the abutments and when open to admit air from the main reservoir chamber into the control chamber, a valve adapted to be operated by the movements of the abutments and when open to exhaust air from the control chamber, a spring bearing on the brake pipe pressure abutment and adapted to oppose the force exerted by the pressure in the control chamber, means for manually adjusting the tension of said spring, an equalizing discharge valve, an equalizing discharge piston connected to said valve, an exhaust valve, electrically operated means for holding the exhaust valve closed, means for opening said valve when the electrically operated means is rendered ineffective, and means operated by the opening of the said exhaust valve to connect the control chamber to a chamber on one side of the equalizing discharge piston and to connect the brake pipe to a chamber on the other side of the equalizing discharge piston, the brake pipe pressure opposing the control chamber pressure and opening the equalizing discharge valve to permit brake pipe pressure to exhaust to atmosphere until said brake pipe pressure has equalized with the pressure in the control chamber.

20. A brake pipe vent valve for automatic train stop apparatus comprising a brake pipe chamber, a control chamber, a movable abutment subject to the pressure in the brake pipe chamber, a movable abutment subject to the pressure in the control chamber, this latter abutment being larger in area than the train pipe pressure abutment, means rigidly connecting said two abutments whereby the pressures in said chambers will oppose each other, a valve adapted to be opened and closed by the movements of the abutments and when open to admit air into the control chamber, a valve adapted to be operated by the movements of the abutments and when open to exhaust air from the control chamber, an equalizing discharge valve, an exhaust valve, means for controlling the operation of the exhaust valve, and means automatically operating upon the opening of the said exhaust valve to open the equalizing discharge valve, the brake pipe pressure opposing the control chamber pressure to hold the equalizing discharge valve open to permit brake pipe pressure to exhaust to atmosphere until said brake pipe pressure has equalized with the pressure in the control chamber.

21. A brake pipe vent valve for automatic train stop apparatus comprising a brake pipe chamber and a control chamber, means operated by the pressures in the said brake pipe chamber in the control chamber for establishing a pressure in the control chamber at a predetermined degree of pressure below the pressure in the brake pipe chamber, an equalizing discharge valve, an equalizing discharge piston connected to said valve, an exhaust valve, electrically operated means for holding the exhaust valve closed, means for opening said valve when the electrically operated means is rendered ineffective, a slide valve chamber, a slide valve therein, a main piston connected thereto, means for connecting the main reservoir to the slide valve chamber, means permitting an equalization of pressures on opposite sides of the said main piston, a spring to hold the slide valve in inoperative position with equalized pressure on opposite sides of the main piston, a passage leading from the chamber at one side of the said piston to the exhaust valve said valve normally closing said passage, means whereby the slide valve in operative position will connect the control chamber to a chamber on one side of the equalizing discharge piston and will connect the brake pipe to a chamber on the other side of the equalizing discharge piston, the brake pipe pressure opposing the control chamber pressure and opening the equalizing discharge valve to permit the brake pipe pressure to exhaust to atmosphere until said brake pipe pressure has equalized with the pressure in the control chamber, and means whereby the slide valve in its inoperative position will connect the chambers on opposite sides of the equalizing piston to atmosphere.

22. A brake pipe vent valve for automatic train stop apparatus comprising a brake pipe chamber and a control chamber, means for establishing a pressure in the control chamber at a predetermined degree of pressure below the pressure in the brake pipe chamber, an equalizing discharge valve, an exhaust valve, means for controlling the operation of the exhaust valve, and means automatically operating upon the opening of the said exhaust valve to open the equalizing discharge valve, the brake pipe pressure opposing the control chamber pressure to hold the equalizing discharge valve open to permit brake pipe pressure to exhaust to atmosphere until said brake pipe pressure has equalized with the pressure in the control chamber, a main reservoir connection, a brake valve connection, a valve controlling communication between said connections, and means operating to close said controlling valve when the exhaust valve is open.

23. A brake pipe vent valve for automatic train stop apparatus comprising a brake pipe chamber and a control chamber, means operated by the pressures in the said brake pipe chamber and in the control chamber for establishing a pressure in the control chamber at a predetermined degree of pressure below the pressure in the brake pipe chamber, an equalizing discharge valve, an equalizing discharge piston connected to said valve, an exhaust valve, electrically operated means for holding the exhaust valve closed, means for opening said valve when the electrically operated means is rendered ineffective, a slide valve chamber, a slide valve therein, a piston connected thereto, means for connecting the main reservoir to the slide valve chamber, means permitting an equalization of pressures on opposite sides of the said piston, a spring to hold the slide valve in inoperative position with equalized pressure on opposite sides of the piston, a passage leading from the chamber at one side of the piston to the exhaust valve said valve normally closing said passage, means whereby the slide valve in operative position will connect the control chamber to a chamber on one side of the equalizing discharge piston and will connect the brake pipe to a chamber on the other side of the equalizing discharge piston, the brake pipe pressure opposing the control chamber pressure and opening the equalizing discharge valve to permit the brake pipe pressure to exhaust to atmosphere until said brake pipe pressure has equalized with the pressure in the control chamber, a main reservoir connection, a brake valve connection, a valve controlling communication between said connections, and means operating to close said controlling valve when the exhaust valve is open.

In testimony whereof I hereunto affix my signature.

SPENCER G. NEAL.